(12) United States Patent
Catlett

(10) Patent No.: US 6,230,375 B1
(45) Date of Patent: May 15, 2001

(54) LATCHING S HOOK

(75) Inventor: Timothy J. Catlett, Maryville, MO (US)

(73) Assignee: Laclede Chain Manufacturing Co., St. Louis, MO (US)

( * ) Notice: Subject to any disclaimer, the term of this patent is extended or adjusted under 35 U.S.C. 154(b) by 0 days.

(21) Appl. No.: 09/359,835

(22) Filed: Jul. 23, 1999

(51) Int. Cl.[7] .................................................. A44B 13/02
(52) U.S. Cl. ............................................................ 24/599.8
(58) Field of Search ............................. 24/68 CT, 68 TT, 24/116 R, 599.6, 599.7, 599.8; 294/82.19

(56) References Cited

U.S. PATENT DOCUMENTS

| D. 33,410 | 10/1900 | Covert . |
|---|---|---|
| 646,519 | 4/1900 | Covert . |
| 684,421 | * 10/1901 | Forstner . |
| 812,861 | * 2/1906 | Martin . |
| 959,744 | 5/1910 | Hubbard . |
| 1,240,810 | 9/1917 | Baxter . |
| 1,256,101 | 2/1918 | Baxter . |
| 1,390,129 | * 9/1921 | Hesse . |
| 1,879,168 | 9/1932 | Freysinger . |
| 3,194,598 | * 7/1965 | Goldfuss . |
| 3,797,229 | * 3/1974 | Rueff et al. . |
| 3,831,229 | 8/1974 | Craven . |
| 3,968,988 | * 7/1976 | Carfagno . |
| 4,013,314 | 3/1977 | Archer . |
| 4,122,585 | 10/1978 | Sharp et al. . |
| 4,440,432 | 4/1984 | Goris . |
| 4,546,523 | 10/1985 | Bailey, Jr. . |
| 4,955,651 | 9/1990 | Barber . |
| 5,020,843 | 6/1991 | Lucas . |
| 5,078,073 | * 1/1992 | Betz et al. . |
| 5,257,441 | 11/1993 | Barlow . |
| 5,579,564 | 12/1996 | Rullo et al. . |
| 5,664,304 | * 9/1997 | Tambornino . |
| 5,694,668 | 12/1997 | Rohlf . |
| 5,913,479 | * 6/1999 | Westwood, III . |

* cited by examiner

Primary Examiner—James R. Brittain
(74) Attorney, Agent, or Firm—Blackwell Sanders Peper Martin

(57) ABSTRACT

A latch for use on a S hook includes a cuff portion for mounting the latch on a S hook. The cuff portion has an elongated body with a first end and a second end, and a pair of walls extending longitudinally from the elongated body in the same direction as one another, to thereby flank a straight portion of the S hook when the latch is mounted in operative position on the S hook. A lever of the latch has a first end and a second end, and is lever pivotally connected at the first end thereof to the first end of the elongated body of the cuff portion. The second end of the lever is free and positioned inside of an open end of the S hook when the latch is mounted in operative position on the S hook and a spring mechanism is connected to the latch to thereby bias the latch lever away from the latch cuff portion and against the internal aspect of the open end of the S hook.

16 Claims, 11 Drawing Sheets

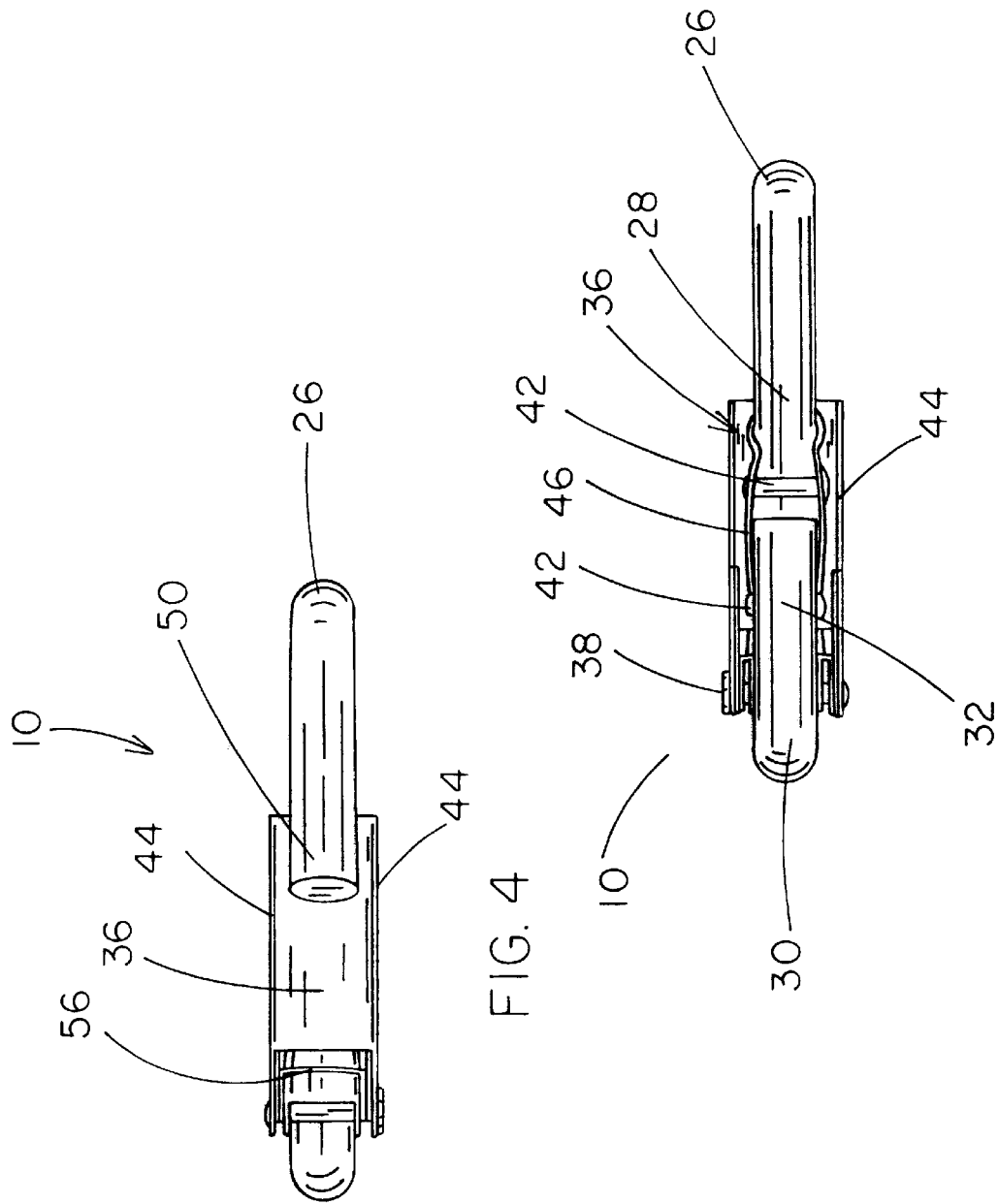

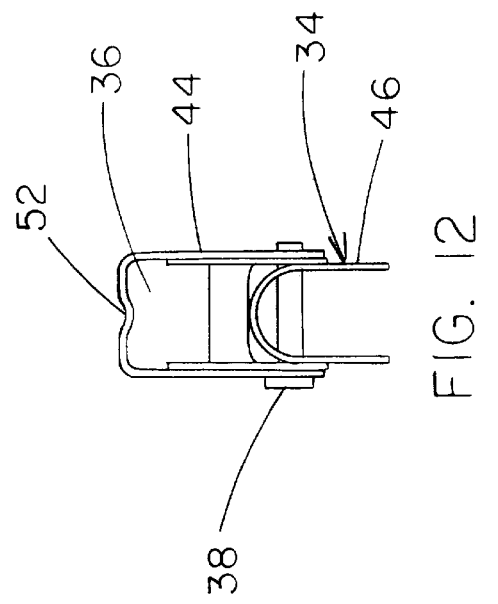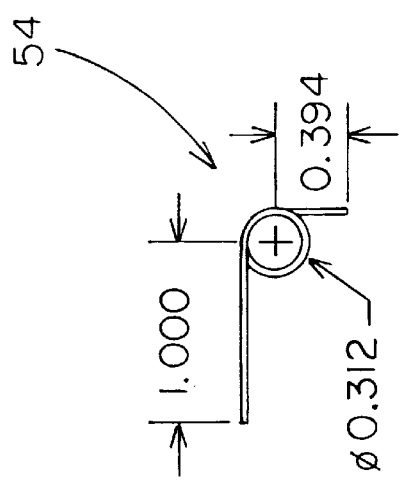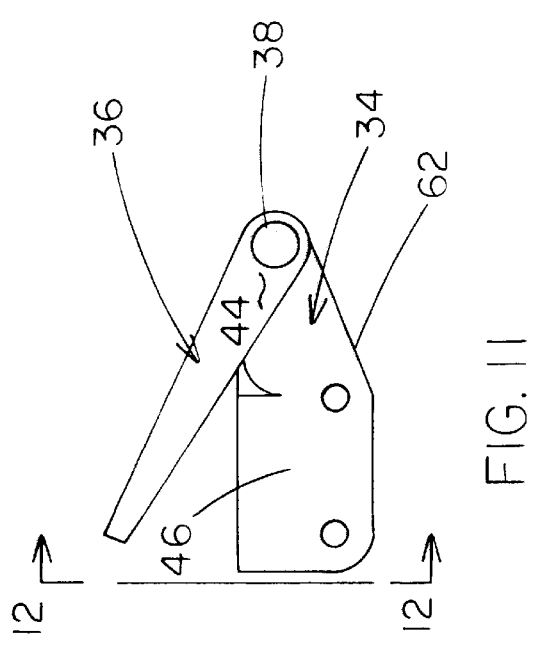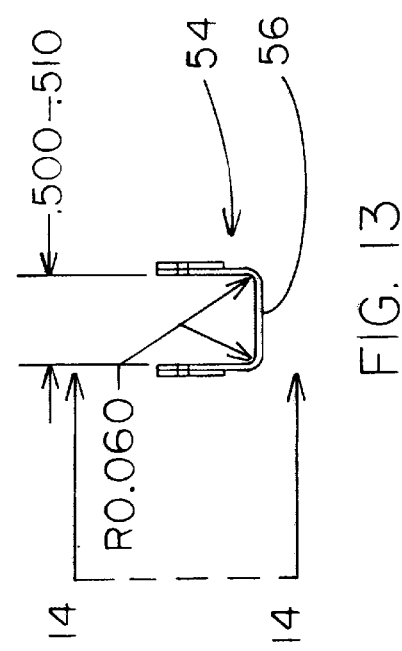

LATCHING S HOOK

BACKGROUND AND SUMMARY OF THE INVENTION

FIELD OF THE INVENTION

The present invention relates generally to the field of connecting hooks, and, more particularly to a latching "S" hook of a type which may be typically used for attaching a trailer safety chain to a truck, for example, and in which the latch portion can be adapted to retrofit or upgrade an existing hook without weakening the hook. The structural design of the new hook keeps the latch closed even if the chain pulls against the latch, because the latch will strike against the hook in the closed position.

BACKGROUND OF THE INVENTION

Previous trailer hooks have taken a number of forms, with various benefits and disadvantages. The commonly used S hook, if not provided with a latch of some sort, is used with the risk that it can release from its connection site, simply due to bumps and vibrations which occur in normal use. Thus, some sort of mechanism, such as a latch, is needed to keep the trailer hitch or other connector secured within the open end of the hook. A variety of attempts have been made to address this need. In some cases adding a "keeper" latch to a hook requires replacing the entire hook. In other cases, adding a latch requires weakening the existing hook by drilling a hole through the hook material in order to fix or hold the latch on the hook.

The majority of known closing hooks are snap hooks, which are not of an "S" shape. Rather, they take the form of snap hooks with an eye formed through the hook at some point to connect the latch directly to the hook. Such structures are necessarily weak, because of the material integrity being disrupted by the formed eye. These known wire form hooks are not as strong as standard traditional trailer safety hooks and can pose a significant consumer safety risk.

There are also forged snap hooks presently on the market, which have a closed forged eye. However, these hooks require a secondary means of attachment in order to connect a chain to the eye. This additional requirement introduces an element of potential weakness, and entails greater expense.

One example of a known locking S hook is disclosed in U.S. Pat. No. 3,797,229, for an S hook with a connector link which engages opposed portions of the hook to cause resistance of a mutual spreading or parting under pulling forces. This function is quite different from that of the new latching S hook, as further described below.

Other known latching hooks are also less than perfect because they are structurally weak, will break down upon extended exposure to sunlight, and heat or extreme cold. Other known hooks with latches are designed such that the latch can inadvertently release if pushed by the chain or hook within the latching connecting hook. Thus, there has been a need in the market place for a durable latching hook which is suitable for uses requiring strength and movement, such as for connecting a trailer to a trailer hitch. The required hook must be strong, durable, and not subject to opening accidentally. Also, the latch portion of the new hook should be adaptable to or capable of being retrofit to existing "wire form" trailer safety hooks without damage to or weakening of the hook.

SUMMARY OF THE INVENTION

The new latching S hook is a wire-form S Hook with a spring latch formed of stamped metal and attached to the hook in a unique manner. The latch of the new hook is connected more or less as a cuff mechanism secured by squeezing it around a central portion of the hook and holding it in such a position with at least one brad (or a rivet, bolt, screw, or other securement device), which runs beneath the hook, from one side to the other of the latch sleeve. The moveable arm of the latch pivots away from the connecting sleeve to contact the free end of the S hook.

The latch described below does not require a specially designed hook, but rather can simply be attached to a known, standard "wire form" hook, such as a trailer safety hook or the like. This allows more flexibility of use of the product, since it can be utilized on hooks made by different manufacturers and retrofit or used to upgrade existing hook equipment. By contrast, known hook/latch designs require replacement of the whole hook, in order to add a safety latch, requiring extensive costs and time to accomplish the installation. This procedure also normally entails equipment being removed from use for a time. With the new hook, retrofitting or replacement of the latch can be done in the field in a matter of minutes, without the necessity of replacing the entire hook and latch assembly, and such potential latch replacement does not weaken the hook or chain assembly.

In order to connect the new latch to an S hook there is no need for drilling, welding or other weakening types of attachment to the hook. With addition of the new latch to an S hook, the hook's strength is not compromised in any way by the new latch, thus allowing for standard hooks to be used for any specific class of chain needed for a particular job.

The latch of the new hook described herein is formed of metal such a steel and thus is not prone to breakdown due to sunlight or exposure to environmental conditions, in contrast to known latches formed of rubber or plastic. Thus the new latch is very durable and the construction thereof is also inexpensive as compared to those formed by other possible methods, such as forging latching hooks. Further, inventory investment is decreased because the new latch can be used on existing trailer safety hook designs. No special hook is required to accommodate the new latch structure.

In view of the above shortcomings of the known art it is among the several objects of the present invention to provide a latch for a trailer safety hook and a latching S hook with such a latch, which latch and hook are durable, inexpensive to produce and facile to operate. It is further among the objects of the present invention, having the features indicated, that the new latch be useful for retrofitting to existing wire form hooks without weakening the hook and that the latch be mounted to the hook and structured so that when pushed upon by a chain or hitch within the new hook that the latch will not release, but will instead stay secure.

Accordingly, in view of the above goals and advantages, the present invention is, briefly, a latch for use on a S hook. The latch includes a cuff portion for mounting the latch on a S hook. The cuff portion has an elongated body with a first end and a second end, and a pair of walls extending longitudinally from the elongated body in the same direction as one another, to thereby flank a straight portion of the S hook when the latch is mounted in operative position on the S hook. A lever of the latch has a first end and a second end, and is lever pivotally connected at the first end thereof to the first end of the elongated body of the cuff portion. The second end of the lever is free and positioned inside of an open end of the S hook when the latch is mounted in operative position on the S hook and a spring mechanism is connected to the latch to thereby bias the latch lever away from the latch cuff portion and against the internal aspect of the open end of the S hook.

BRIEF DESCRIPTION OF THE DRAWINGS

FIG. 4 is a top plan view of the latching S hook of FIG. 1.

FIG. 5 is a bottom plan view of the latching S hook of FIG. 1.

FIG. 11 is a schematic side elevational view of the latch kit of the latching S hook of FIG. 1, shown from the side opposite that in FIG. 1.

FIG. 12 is a schematic end view of the latch kit of FIG. 11.

FIG. 13 is a schematic view of the spring portion of the latch kit of FIG. 12.

FIG. 14 is a side view of the spring of FIG. 13.

Throughout the drawings like parts will be indicated by like element numbers.

DESCRIPTION OF PRACTICAL EMBODIMENTS

Figure 8:
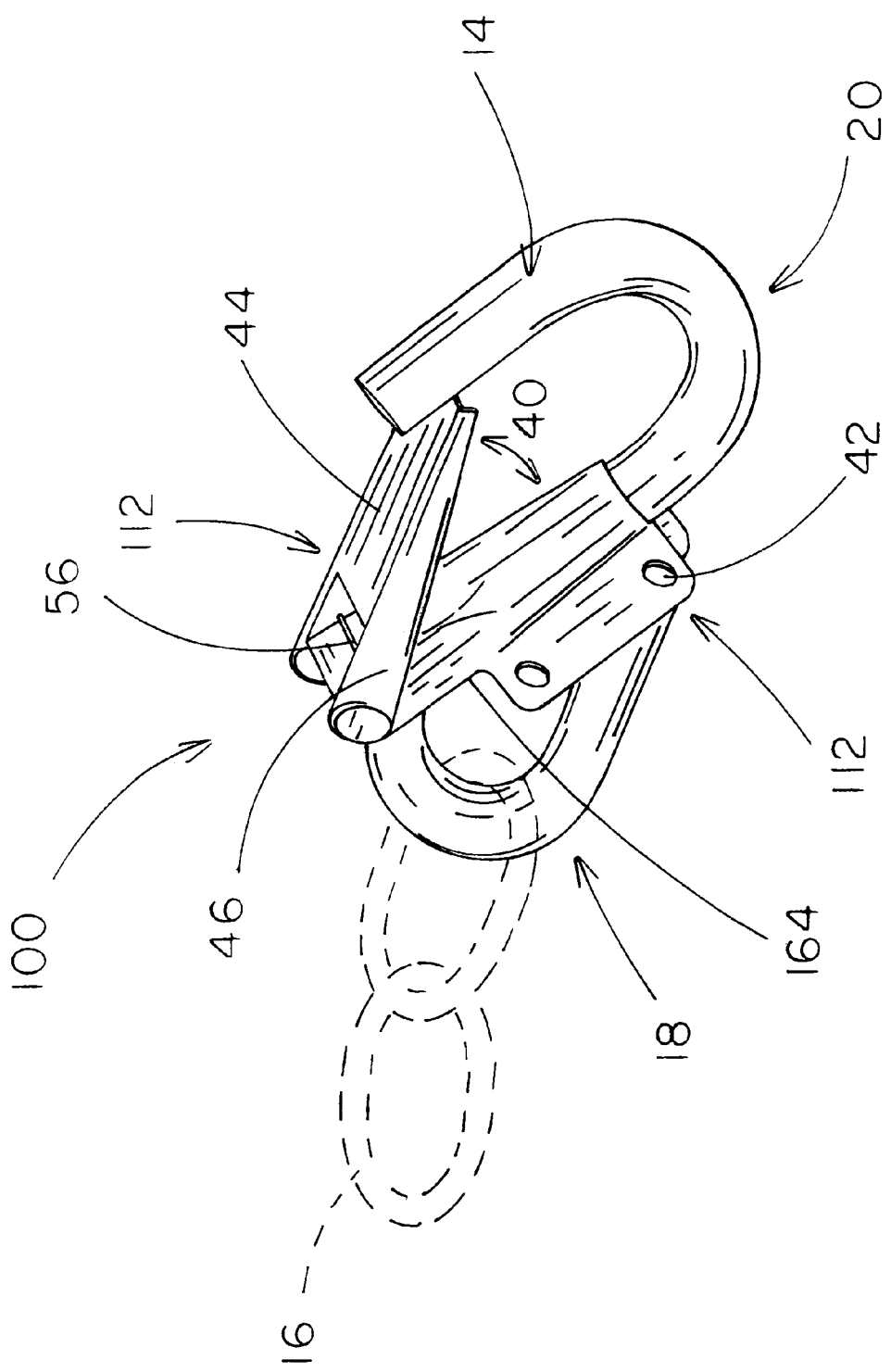
FIG. 8 is a top, front perspective view of an alternative embodiment of the latching S hook of FIG. 1.
Figure 9:
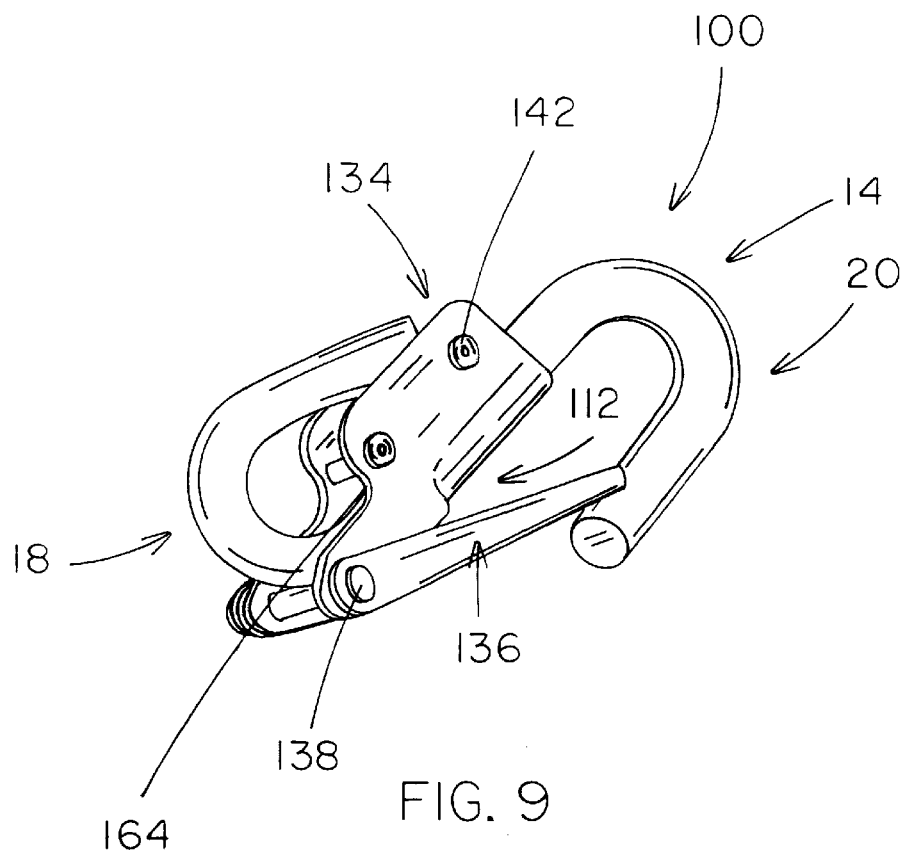
FIG. 9 is an upside down perspective view of the latching S hook of FIG. 8.
Figure 10:
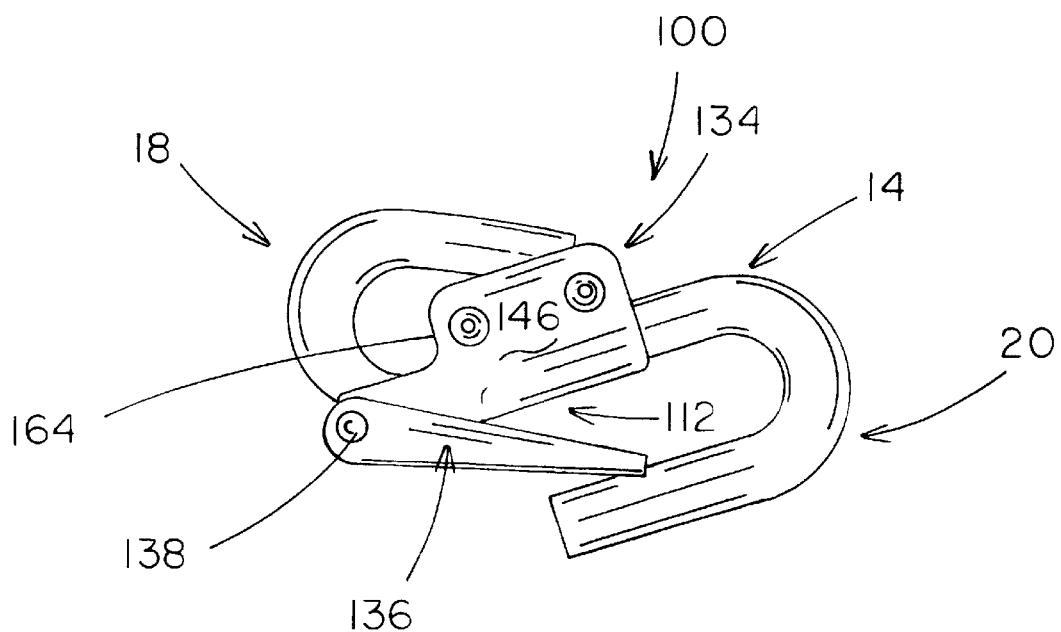
FIG. 10 is a side elevational view of the latching S hook of FIG. 9, the opposite side being a mirror image thereof.

With reference to the drawings, FIGS. 1–7 depict the preferred embodiment of a latching S hook, generally designated 10, including the new latch portion 12 connected in normal operative position on an S hook 14. FIGS. 8–10 illustrate an alternative and practical embodiment 100, including a latch portion 112 connected to the same S hook 14 structure. The shape of one portion of the latch 12 as compared to that of the corresponding portion in latch 112 is the only difference between the two embodiments illustrated. The schematic engineer's illustrations shown in FIGS. 11–21 illustrate the hook kit or assembly of the new latching S hook and the portions thereof, individually, for clarity and accuracy. For simplicity of discussion, all parts which are substantially identical between the embodiments will bear the same reference numbers, regardless of which embodiment is being described.

Figure 1:
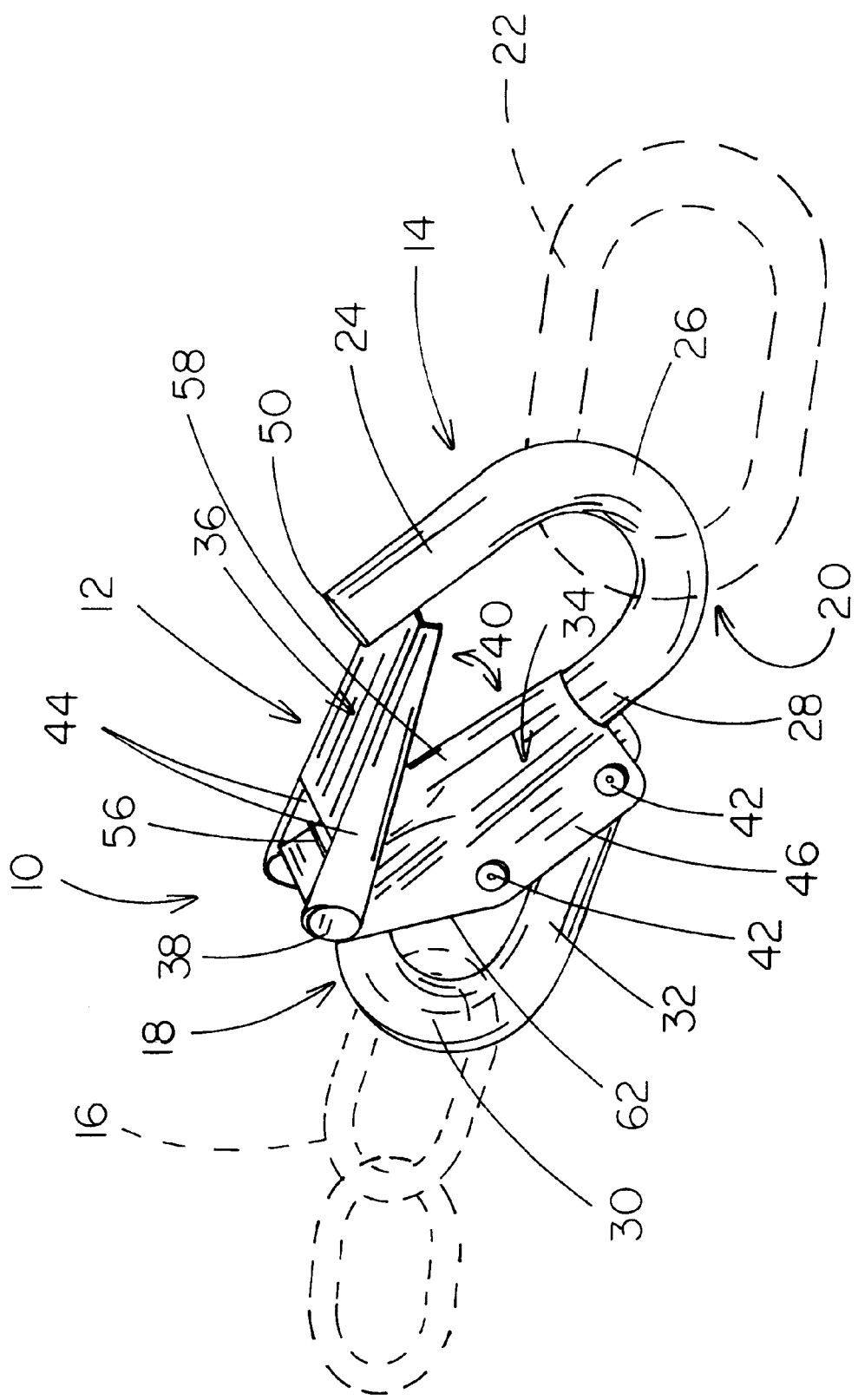
FIG. 1 is a top, front perspective view of a latching S hook constructed in accordance with and embodying the present invention.
Figure 2:
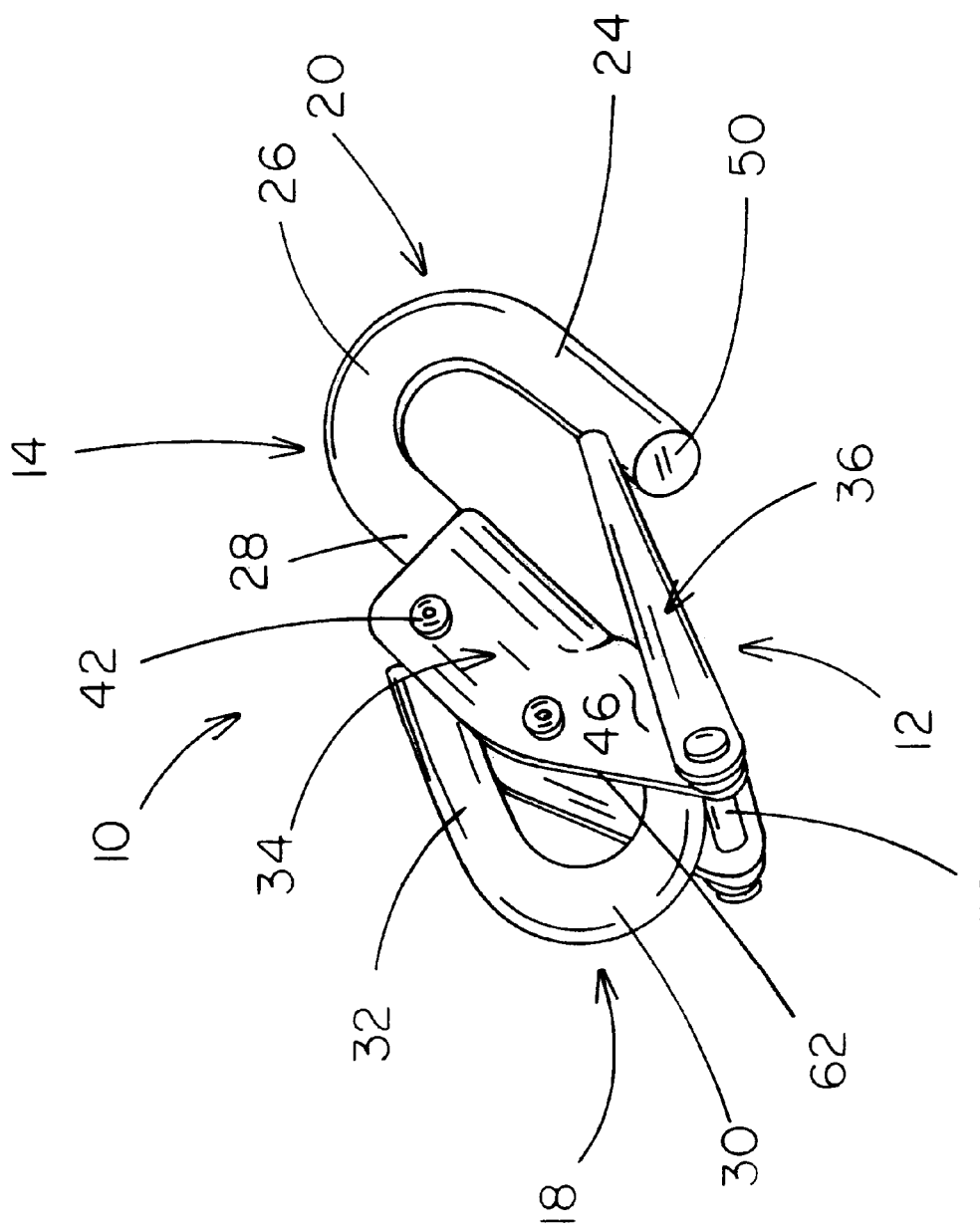
FIG. 2 is an upside down perspective view of the latching S hook of FIG. 1.
Figure 3:
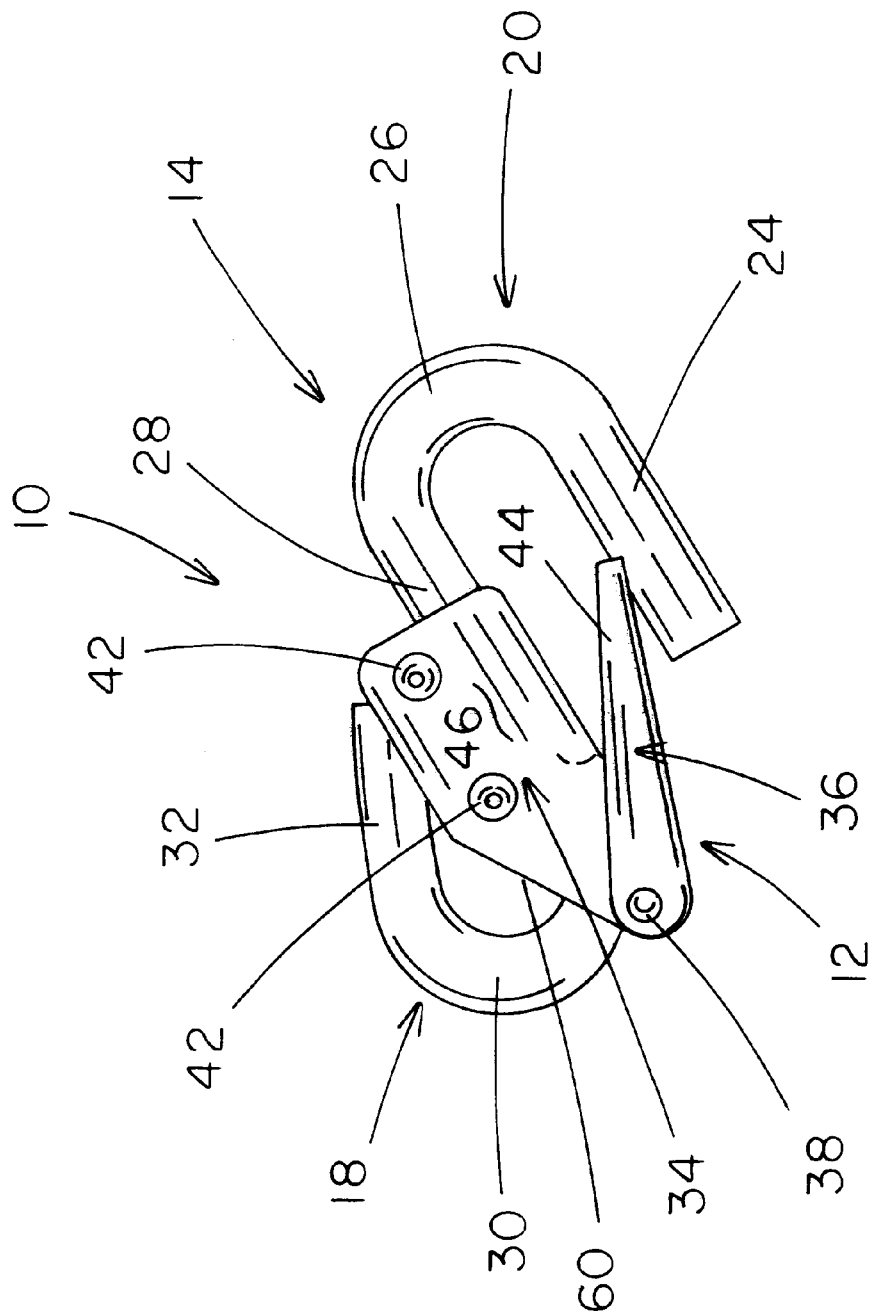
FIG. 3 is a side elevational view of the latching S hook of FIG. 2, the opposite side being a mirror image thereof.
Figure 6:
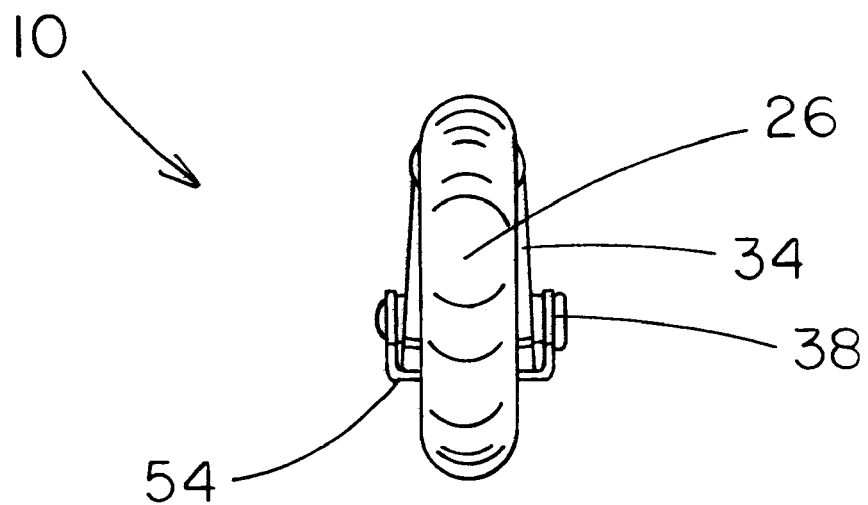
FIG. 6 is a front end elevational view of the latching S hook of FIG. 1, taken from the end shown at the right side of FIG. 3.
Figure 7:
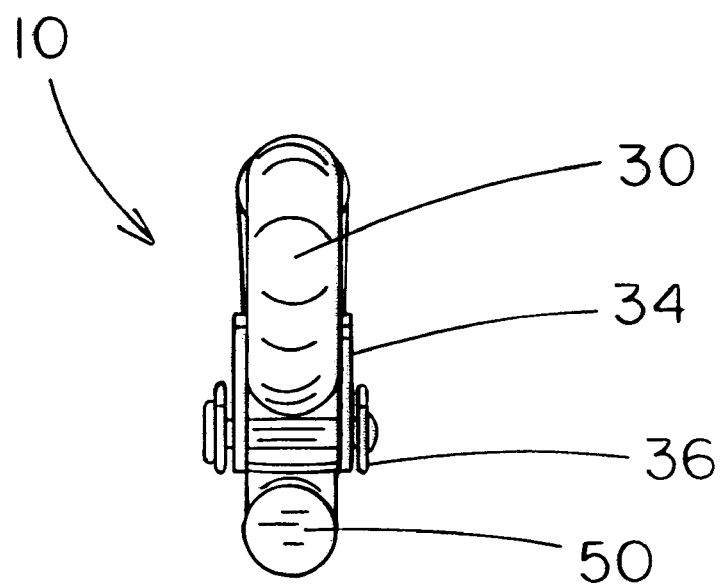
FIG. 7 is a back end elevational view of the latching S hook of FIG. 1, taken from the end shown at the left side of FIG. 4.

As shown in FIGS. 1 and 8, for example, the latch kit or portion of the new latching S hook is disposed inoperative position on a hook 14 with the hinged end of the latch directed toward the closed end of the S hook 14, and the open, movably end of the latch lever directed toward the open end of the S hook. In the first embodiment, as seen in FIGS. 1–3, 11, 18 and 20, dual walls 46 of cuff 34 (described further hereafter) extend along an angled edge 62 from about the level of connection brads 42 to a point adjacent to pivot point 38. By contrast, in the second embodiment, as seen in FIGS. 8–10, the edge 164 is stepped, rather than being a straight line. This is a manufacturing option and either structure, as well as other conceivable variations thereof, are within the scope of the invention and represents to only substantive difference between the two embodiments 10, 100 illustrated herein. Accordingly, the same hook 14 is shown in each case and elements equivalent to those already described in the first embodiment are not described again in regard to the second embodiment, but are instead give an element number which is the same, except preceded by the numeral "1". In some instances, hereinbelow, only the first embodiment is mentioned, for simplicity of the disclosure. However, it is to be understood that, with the exception of the difference in shapes between edges 62 and 64, the description of the first embodiment shall include or apply to the second embodiment as well.

For purposes of illustration of use, FIG. 1 shows a chain 16, indicated in phantom connected to the closed end 18 of hook 14. At the opposite, open end 20 of hook 14 there is indicated in phantom a conventional connector 22, which connector may be a trailer hitch, or a closed link of heavy chain or other suitable device for connecting latching S hook 10 (or 100) to another object, such as a truck or a stationary tie down, for example. Although hook ends 18, 20 are shown as having arcuate openings, in the conventional manner, for receiving the chain or other connector, it is to be understood that the openings could be shaped otherwise and still be in keeping with the invention.

FIGS. 1–3 and 8–10 illustrate the preferred shape of S hook 14, wherein open end 20 has a terminal straight portion 24 which extends into an arcuate open portion 26 which turns back and extends into a straight central hook portion 28. Straight central hook portion 28 is spaced apart from and parallel to the terminal straight portion 24 so as to form a space within which to receive connector element 22, as shown in FIG. 1.

Central straight hook portion 28 extends away from arcuate portion 26 and continues into another arcuate portion 30 of "closed" end 18, which arcuate portion 30 in turn continues into a straight portion 32 of closed end 18. As seen in the figures, arcuate portions 26, 30 turn away from central straight portion 28 on opposite ends of the central portion and in opposite directions from one another, yet in the same plane. Unlike the relationship at open end 20, at closed end 18, the terminal straight portion does not extend parallel to the central straight portion, but rather continues an angle toward central straight portion 28, until nearly touching the central portion. In this manner, closed hook end 18 provides a site of constant disposition of chain 16, while open end 20 permits selective receipt and release of a connector, such as element number 22. The hook portion 14 of the second embodiment 100 illustrated in FIGS. 8–10 is identical to that of the first embodiment and thus is numbered similarly and will not be described again.

Latch mechanism (sometimes referred to herein as a "kit") 12 is composed of an open-sided cuff 34 and a lever 36 as well as a spring member 54 and various connectors. Cuff 34, 134 wraps around and fits over the central straight hook portion 28, and lever member 36, which is connected by a hinge 38 or other pivot point at one end of the lever to one end of cuff 34. Lever 36 is free at the opposite end, in order to pivotally contact and release from contact with the inwardly disposed aspect of straight member 24 on open hook end 20. The action of lever 36, 136 is indicated by arrow 40 in FIGS. 1 and 8.

Figure 16:
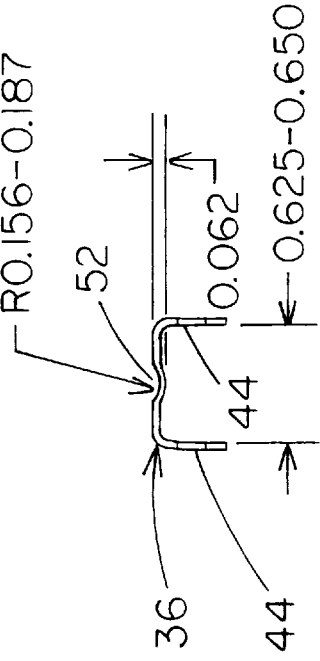
FIG. 16 is a schematic end view of the lever of FIG. 15.
Figure 17:
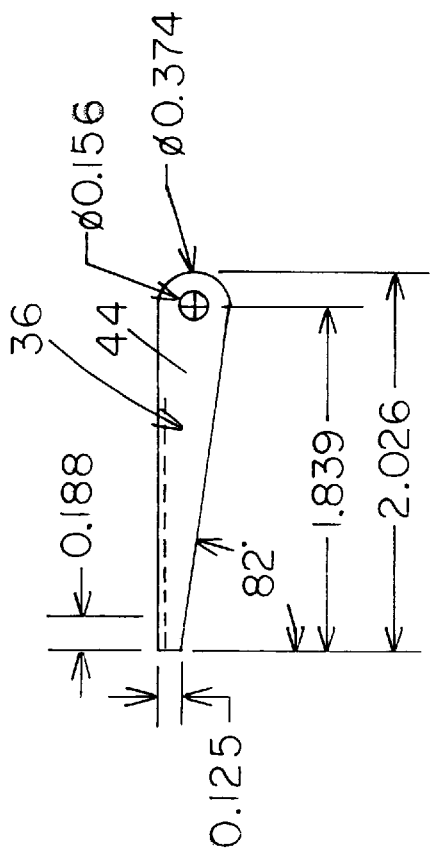
FIG. 17 is a schematic side elevational view of the lever of FIG. 16.
Figure 15:
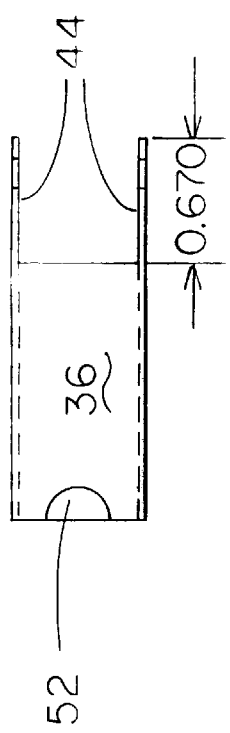
FIG. 15 is a schematic top plan view of the lever portion of the latch kit of FIG. 11.
Figure 18:
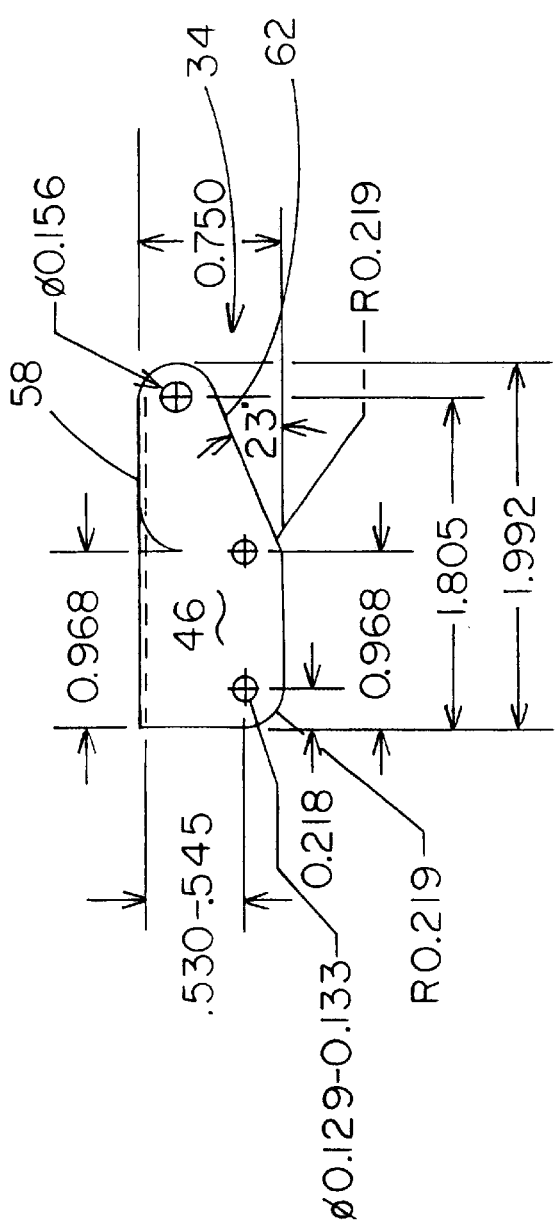
FIG. 18 is a schematic side elevational view of the cuff portion of the latch kit of FIG. 11.

Two opposed side walls or ribs 44 extend from lever 36 along substantially the entire length thereof, and toward cuff 34. Walls 44 serve to strengthen lever 36 longitudinally. As seen in FIGS. 15 and 16, there is preferably formed a depression or dimple 52 in the outermost, free end of lever 36. Dimple 52 receives tip 50 of straight portion 24 of hook open end 20, to provide a stabilizing seat for the hook tip 50 against the free end of lever 36.

Figure 19:
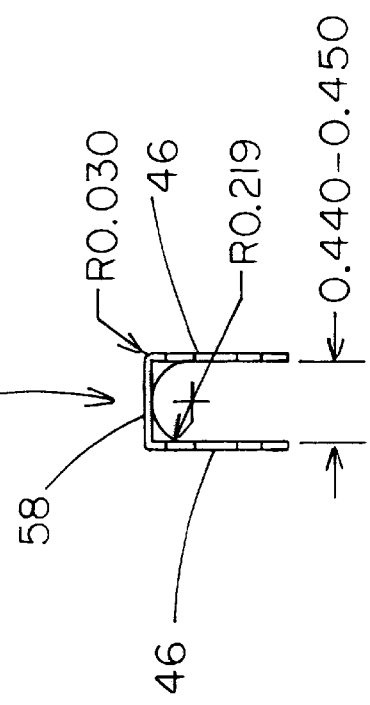
FIG. 19 is a schematic end elevational view of the cuff portion of FIG. 18.
Figure 20:
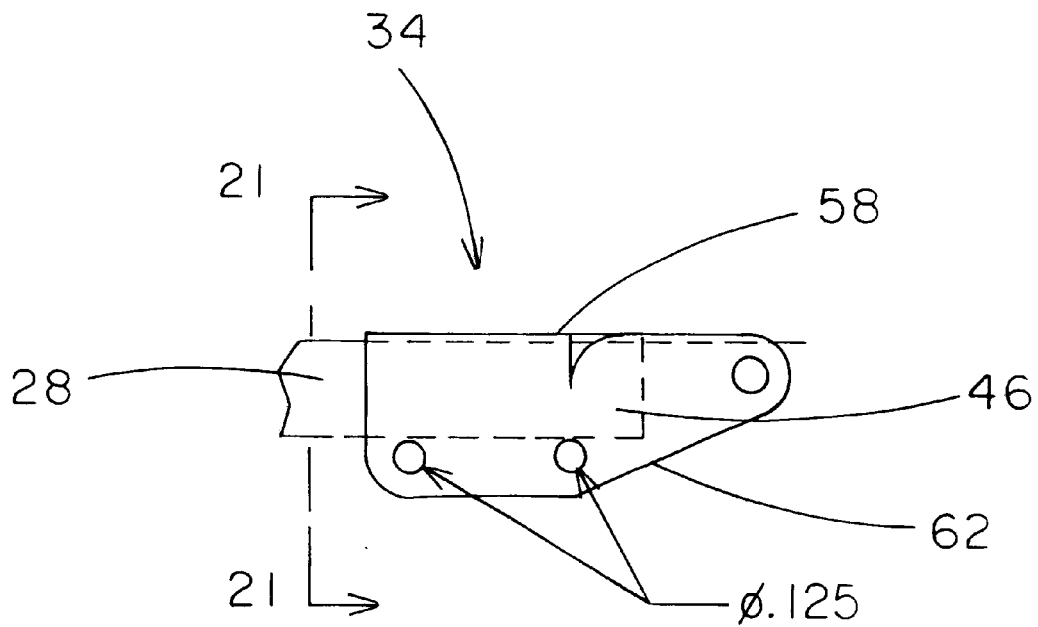
FIG. 20 is a schematic side elevational view of the cuff of FIG. 19 showing the position of the hook, in phantom, within the cuff.
Figure 21:
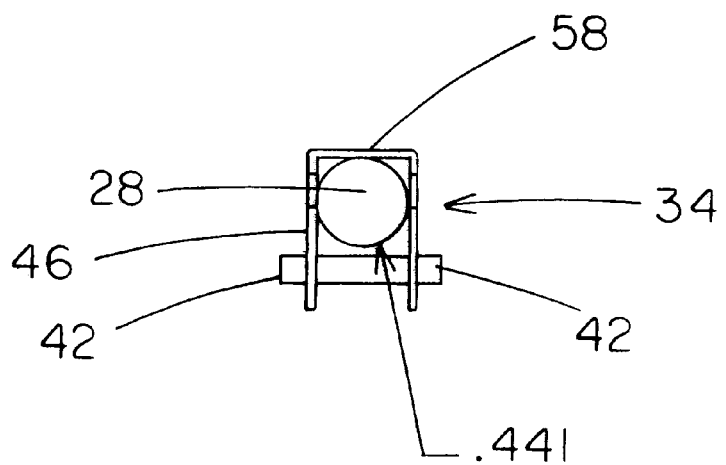
FIG. 21 is a schematic end elevational view of the cuff of FIG. 20, showing the relative positions of the hook within the cuff and of the brad.

Cuff or latch "holder" 34 of the latch kit 12 includes an elongated body 58, which while substantially flat, as initially formed, as shown in FIGS. 18–21, can become somewhat arched when secured in normal operative position on hook 14, as body 58 is conformable, that is, capable of being formed to the shape of the wire of hook 14, as shown in FIG. 1. Paired walls 46 extend approximately parallel to one another and in the same direction, from body 58, as shown in FIGS. 19 and 21. Extending walls 46 are substantially flat, as manufactured, but when the latch connector cuff 34, 134 is tightened (conformed) over hook straight portion 28 the walls can become somewhat curved to accommodate the curve of the hook circumference, as illustrated in FIGS. 1–3 and 8. Firm connection with at least one or two brads 42 pulls arms 46 toward one another. It is to be understood throughout, that "brads" 42 can be other connectors, such as rivets, bolts, screws or other securement devices.

Cuff 34, 134 is readily and firmly secured to straight central hook member 28 by the preferred use of at least two brads 42, or other suitable connectors, as shown in the figures. Brads 42 pass over central member 28 and connect two opposed straight sides 46 of cuff 34, which extend beyond the diameter of the straight member on opposite sides thereof. It is preferred that cuff 34, 134 and lever 36, 136 be formed of metal, for strength, and be finished in a manner to deter rusting, such as with an electrogalvanized finish of zinc or an alloy thereof, and that the material of the cuff and latch be approximately 0.030 to 0.035 inches thick. The dimensions shown in the attached drawings are based on a thickness of 0.030, as a useful example, although the invention is not limited thereto.

The dimensions noted on FIGS. 13–21 are in inches and preferred for a latch kit 12 (or 112), which is intended to be used for adapting an S hook with a wire diameter of seven sixteenths inch. These dimensions are intended to illustrate only one useful and practical example, and are in no way intended to limit the invention.

To provide closing action to latch 12, 112, a spring, such as that shown in FIGS. 13 and 14, is secured about hinge brad or pivot point 38. Spring 54 is formed of wire and includes a cross piece 56 which, in operative position, transversely spans the body 58 of cuff 34, 134 and extends beyond both of the opposed sides of the latch width, wraps around the pivot hinge and extends by a distance of about one inch (based on the dimensions used in the figures, for example) longitudinally beneath lever 36, 136 toward the free end of the lever. Spring 54 biases latch lever 36, 136 away from the corresponding latch collar 34, 134, to thereby press the lever against the internal aspect of the hook end 50, when the latch 112 is in operative position on an S hook 14.

The material of spring 54 is preferably, stainless steel or other strong metal, typically (although not necessarily) formed to a diameter in the range of 0.031–0.037 inches. The dimensions shown in the attached FIGS. 13 and 14 are based upon a wire diameter of 0.031.

In use, it will be clear from the figures that if a connector element 22 moves against the latch 12 of new S hook 10, 100 it will press on lever 36, pushing the lever firmly against the internal aspect of the rigid straight portion 24, thereby only causing the latch connection to be more secure. Because a large connector 22 cannot slide under the latch lever 36 it cannot be accidentally released. However, it is a simple matter to intentionally manually release the latched connect of the hook to the connector by merely pressing lever 36 toward straight central member 28 and slipping the open end 20 off the closed connector.

It is to be understood that while the described hook structure is preferred, the new latch kit described herein may be useful mounted on hooks with somewhat varied structures and would still then be considered in keeping with the invention.

In view of the foregoing, it will be seen that the several objects of the invention are achieved and other advantages are attained. Although the foregoing includes a description of the best mode contemplated for carrying out he invention, various modifications are conceivable.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A latch for use on a S hook, the latch comprising:

a conformable cuff portion for mounting the latch on an S hook, the cuff portion having an elongated body with a first end and a second end, and a pair of walls extending longitudinally from the elongated body in the same direction as one another; the walls of the pair of walls being substantially flat and approximately parallel to one another to thereby flank a straight portion of the S hook when the latch is initially mounted on the S hook, the walls having flat and parallel inner surfaces being conformable to varying diameters when tightened around the straight portion of the S hook when mounted in an operative position on the S hook;

a lever having a first end and a second end, the lever being pivotally connected at the first end thereof to the first end of the elongated body of the cuff portion, and the second end of the lever being free and positioned inside of an open end of the S hook when the latch is mounted in operative position on the S hook; and a spring mechanism connected to the latch to thereby bias the latch lever away from the latch cuff portion and against the internal aspect of the open end of the S hook when the latch is mounted on the S hook.

2. The latch of claim 1, wherein the walls of said pair of walls extend sufficiently far beyond the S hook diameter when the latch is installed on said hook so as to provide a site for connection of the pair of walls to each other by at least one connector device.

3. The latch of claim 1, wherein the second end of the lever has a formed depression to receive the free end of the S hook and thereby stabilize the position of the lever against the S hook during normal use.

4. The latch of claim 1, and further wherein the lever portion has at least one longitudinal rib to thereby strengthen the lever to enhance durability of the latch.

5. The latch of claim 1, wherein the cuff and lever are formed of metal.

6. The latch of claim 5, wherein the cuff and lever are formed of galvanized steel.

7. The latch of claim 1, wherein the spring is formed of wire.

8. A latching S hook comprising a S hook having a first end and a second end, the first end of the S hook being open and the second end of the S hook being closed; a central portion of the S hook connecting the open first end to the closed second end; and a latch connected to the central portion of the S hook; said latch comprising:

a conformable cuff portion mounting the latch on the S hook, the cuff portion having an elongated body with a first end and a second end, and a pair of walls extending longitudinally from the elongated body in the same direction as one another and are substantially flat and are approximately parallel to thereby flank a straight portion of the S hook when the latch is mounted in operative position on the S hook and said pair of walls having flat parallel inner surfaces and are adapted to conform to varying diameters of the straight portion of the S hook when tightened;

a lever having a first end and a second end, the lever being pivotally connected at the first end thereof to the first end of the elongated body of the cuff portion, and the second end of the lever being free and positioned inside of an open end of the S hook; and a spring mechanism connected to the latch to thereby bias the latch lever away from the latch cuff portion and against the internal aspect of the open end of the S hook.

9. The latching S hook of claim 8, wherein the first end and the second end of the S hook are generally arcuate.

10. The latching S hook of claim 8, wherein the central portion of the hook is straight.

11. The latching S hook of claim 8, wherein the S hook is formed of steel.

12. The latching S hook of claim 8, wherein the walls of said pair of walls extend sufficiently far beyond the diameter of the S hook so as to provide a site for connection of the pair of walls to each other by at least one connector passed beyond the diameter of the S hook.

13. The latching S hook of claim 8, wherein the second end of the latch lever has a formed depression to receive the free end of the S hook and thereby stabilize the position of the latch lever against the S hook during normal use.

14. The latching S hook of claim 8, and further wherein the latch lever has at least one longitudinal rib to thereby strength the lever to enhance durability of the latch.

15. The latching S hook of claim 8, wherein all elements of the latching S hook are formed of metal.

16. The latching S hook of claim 15, wherein at least some of the elements of the latching S hook are formed of galvanized steel.

* * * * *